United States Patent
Kovic

[15] 3,701,297
[45] Oct. 31, 1972

[54] APPARATUS AND METHOD FOR TRANSPORTING ARTICLES

[72] Inventor: Joseph J. Kovic, Centerville, Mass.

[73] Assignee: Packaging Industries, Inc., Hyannis, Mass.

[22] Filed: July 27, 1970

[21] Appl. No.: 58,420

[52] U.S. Cl. ..........................83/13, 83/276, 83/409, 214/1 BT
[51] Int. Cl. ................................................B65h 5/10
[58] Field of Search..........214/1 BT; 83/276, 13, 409

[56] References Cited

UNITED STATES PATENTS

| | | | |
|---|---|---|---|
| 3,485,393 | 12/1969 | Wilder | 214/1 BT X |
| 3,368,324 | 2/1968 | Leedy | 214/1 BT X |
| 3,586,191 | 6/1971 | Brown, Jr. | 214/1 BT X |
| 3,411,640 | 11/1968 | Wallis | 214/1 BT X |
| 3,431,702 | 3/1969 | Spaulding | 214/1 BT X |
| 2,614,949 | 10/1952 | Sachs | 214/1 BT X |

*Primary Examiner*—James M. Meister
*Attorney*—Kenyon & Kenyon Reilly Carr & Chapin

[57] ABSTRACT

The apparatus and method of the disclosure relate to the lifting, transporting and releasing of articles from one station of a production line operation to another station. The apparatus and method particularly relate to transporting flexible blister packaged articles. The apparatus includes a plurality of transfer arms equipped with suction cups and adapted for lifting the articles and supporting them at a plurality of points along the surface of each article while they are being transported.

17 Claims, 8 Drawing Figures

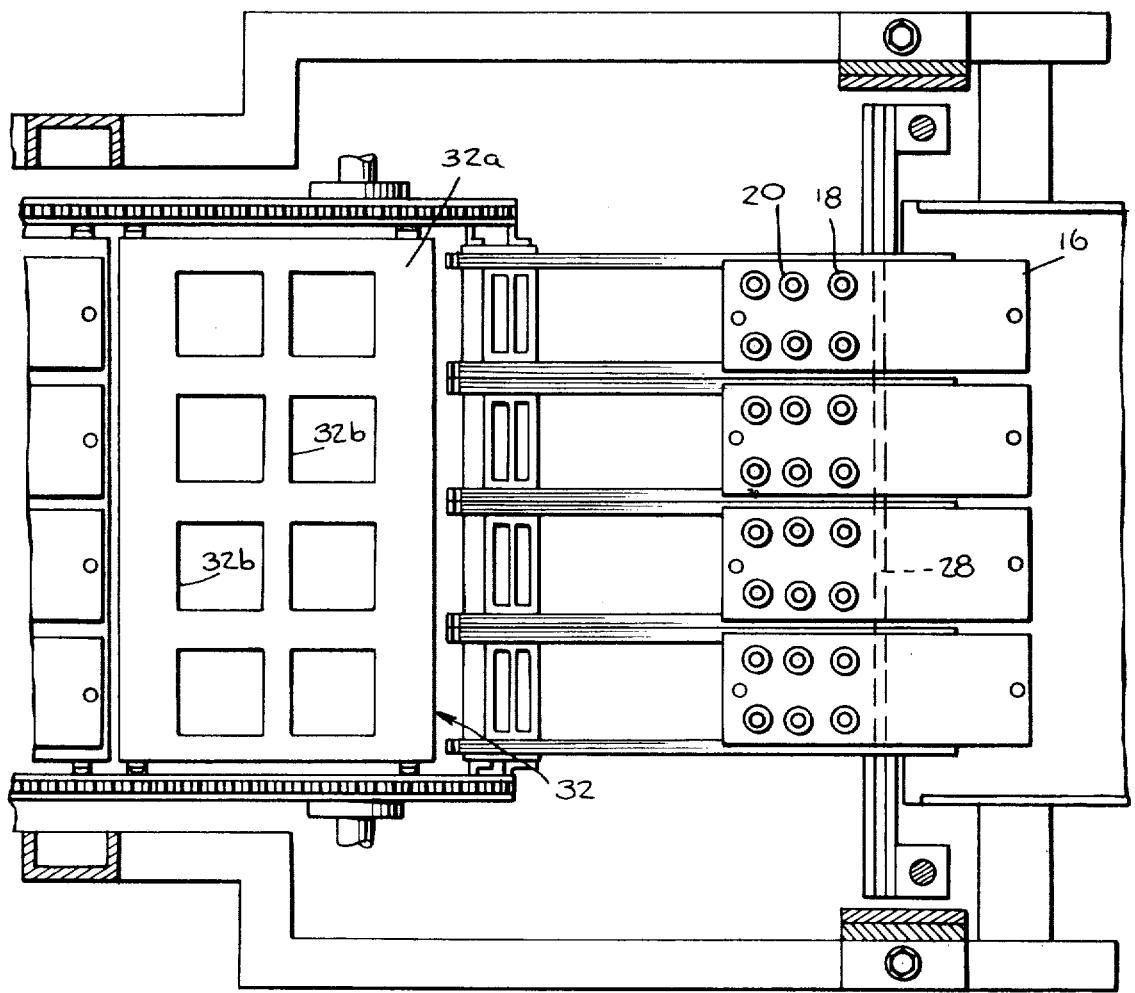
Fig. 6.
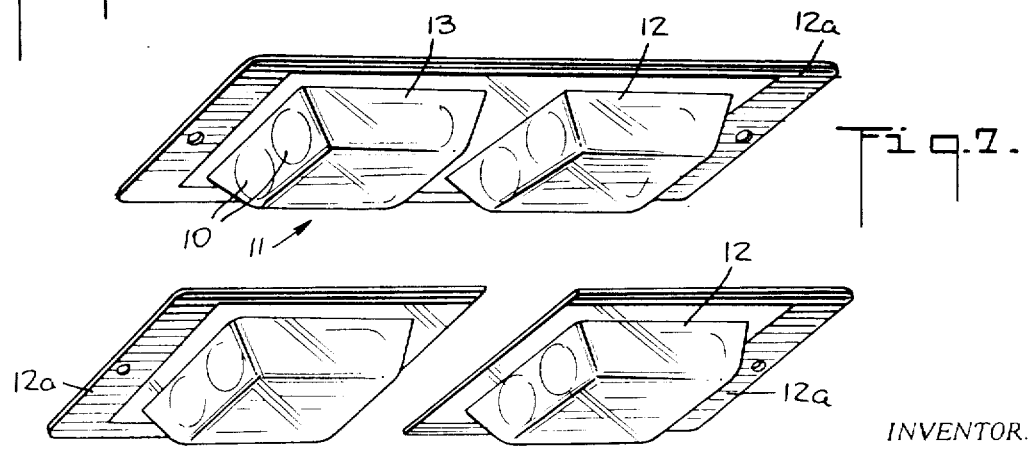
Fig. 7.
Fig. 8.
INVENTOR.
JOSEPH JOHN KOVIC
BY
Kenyon & Kenyon Reilly Carr & Chapin
ATTORNEYS

APPARATUS AND METHOD FOR TRANSPORTING ARTICLES

BACKGROUND OF THE INVENTION

Field of the Invention

This invention relates generally to an apparatus and method for transferring a plurality of articles, such as manufactured articles on a production line, from one position to a second position along the line and from one level to another level along the line. The articles are transported to a predetermined array, i.e., from one stage of the manufacturing or packing assembly line to the next stage. The invention is adapted for use in the packaging of goods in blisters of plastic material which are attached to cards of paperboard material.

SUMMARY OF THE INVENTION

It is an object of the present invention to provide an apparatus and method for transporting a flexible article by engaging the article at a plurality of locations on the surface of the article, thereby overcoming the problem of the bending of the flexible article as a result of the distribution of weight thereof when engaged at a single location.

It is another object of the present invention to provide a method and machine for transporting an article from one location to a second location of a production line operation.

The flexible article is picked up by a plurality of suction cups. The suction cups are arranged in groups and supported by a carriage which can be lowered to bring the suction cups into contact with the article to be transported. Vacuum is applied to the suction cups in order to secure them to the article to be transported. The carriage with the suction cups and the article is raised and moved to a new position along the assembly line. At the new position, the carriage with the suction cups and article is lowered and the vacuum pressure is released whereupon the article is released. The carriage with the suction cups can then be returned to the starting position.

In the preferred embodiment disclosed in this application, the suction cups are arranged on the carriage so that two suction cups grasp the forward end of each article and four suction cups grasp the rearward end of each article. When each article is deposited in its new position, the vacuum at the suction cups grasping the article at its forward end is initially released, thereby freeing the article at its forward end before the rear end of the article is freed. This sequence enables the carriage to continue to advance the article along guide rails at the new position by means of the four suction cups grasping each article at the rear end of the article after the two suction cups grasping the article at its forward end have been released from the article.

Other objects and purposes of this invention will become obvious from the following disclosure.

BRIEF DESCRIPTION OF THE DRAWINGS

FIG. 6 is a fragmentary plan view of the apparatus showing the forward row of articles in a position at which they are about to be severed into two parts;

FIG. 7 is a perspective view of an article before it has been severed into two parts; and FIG. 8 is a perspective view of an article after it has been severed into two parts.

DESCRIPTION OF THE PREFERRED EMBODIMENT

The articles to be transported in accordance with one embodiment of the invention are blister packages in which the blisters enclose any of a great variety of goods for sale; however the invention can be adapted for transporting a wide variety of articles—other than packages.

As shown in FIG. 7, the article 11 to be conveyed comprises a pair of plastic blisters 12 into which goods 10 have been inserted. The goods are placed in the blisters as the blisters are advanced along a conveyor and then pairs of adjacent blisters are attached by heat sealing to a flat card 14 of paperboard material. If the goods 10 are of sufficient weight they can cause the card to sag or bow if an attempt is made to engage and lift the card at one location thereon. In accordance with the invention this problem is overcome by grasping the card at several locations spaced from one another along the length of the card. The package is then transported in an inverted position; that is the goods 10 and blisters 12 are on the underside of the card 14.

Figure 5:
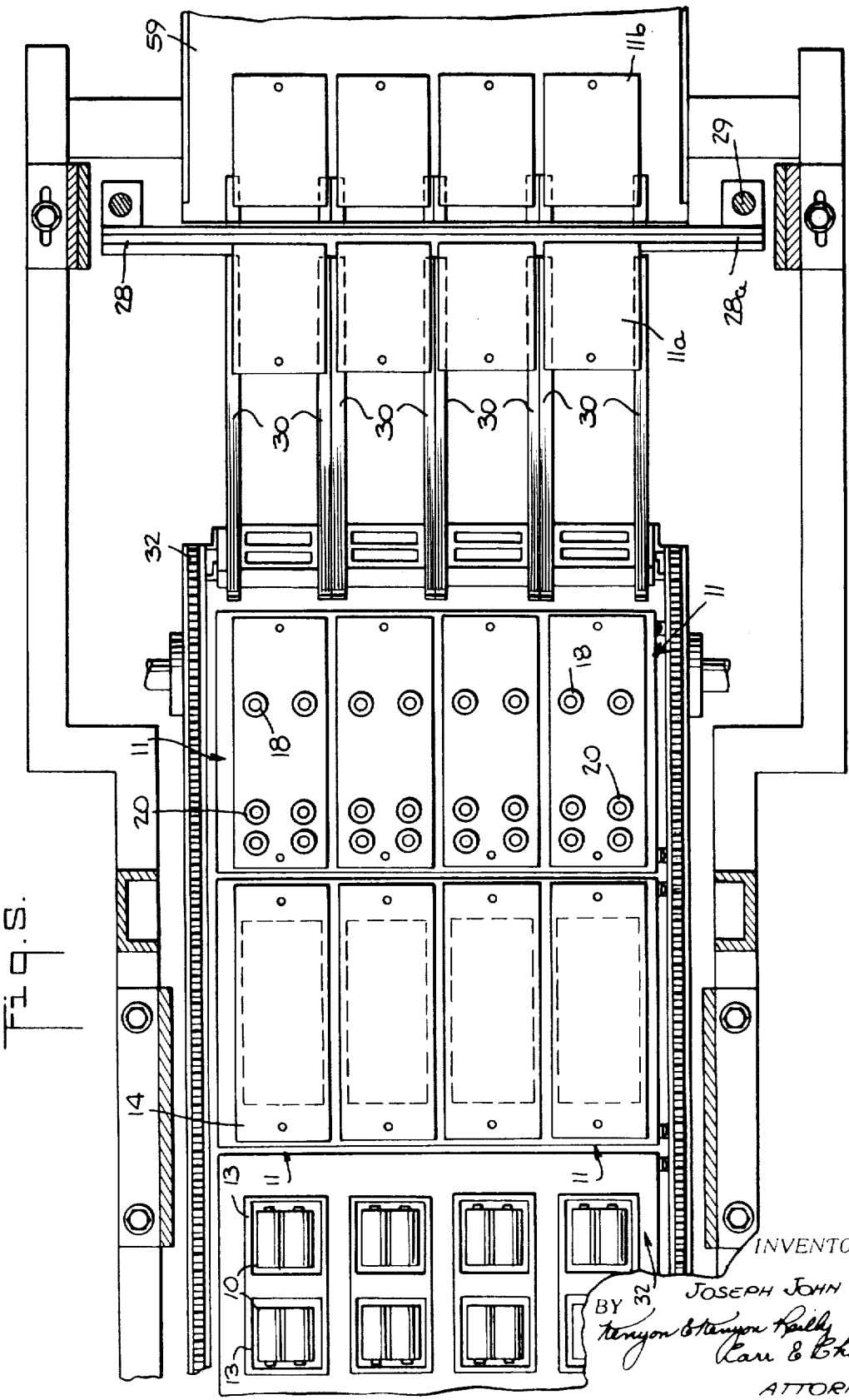
FIG. 5 is a fragmentary plan view of the apparatus of the invention with the carriage mechanism and the card storage magazine removed in order to show the conveyor belt carrying rows of packaged articles in successive stages of the packaging operation.

As shown in FIG. 5, by way of example, the packaged goods 10 are transported four articles at a time with the longer side of each article or package being parallel to the longer side of the adjacent article or package. The direction of movement is from left to right as viewed in FIG. 5. Other embodiments of the invention can be designed to transport a greater or a lesser number of articles at a given time. The packaged goods are transported by means of a plurality of suction cups which are adapted to grasp the top surface of each of the cards 14 at a number of locations thereon for the purpose of lifting and conveying the package to the next position. The embodiment utilizes a total of six suction cups for each package or article 11. Two suction cups 18 grasp the package adjacent its forward end while four suction cups 20 grasp the package adjacent its rearward end. Other embodiments of the invention can be employed to use a greater or lesser number of cups for each package and they can be adapted to grasp the package at other locations along the surface of the package as determined by where the goods are positioned on the card, the size and number of the goods being packaged, and the overall size of the package. The use of a total of six suction cups 18 and 20 in the embodiment of invention shown in FIG. 5 for each package enables the apparatus to lift the package and to maintain the package substantially free of bending or sagging. Since there are four packages in a line extending transversely across the path of travel as shown in FIG. 5, this embodiment uses a total of 24 suction cups for the four packages in the line, that is six suction cups for each of the four packages.

Figure 1:
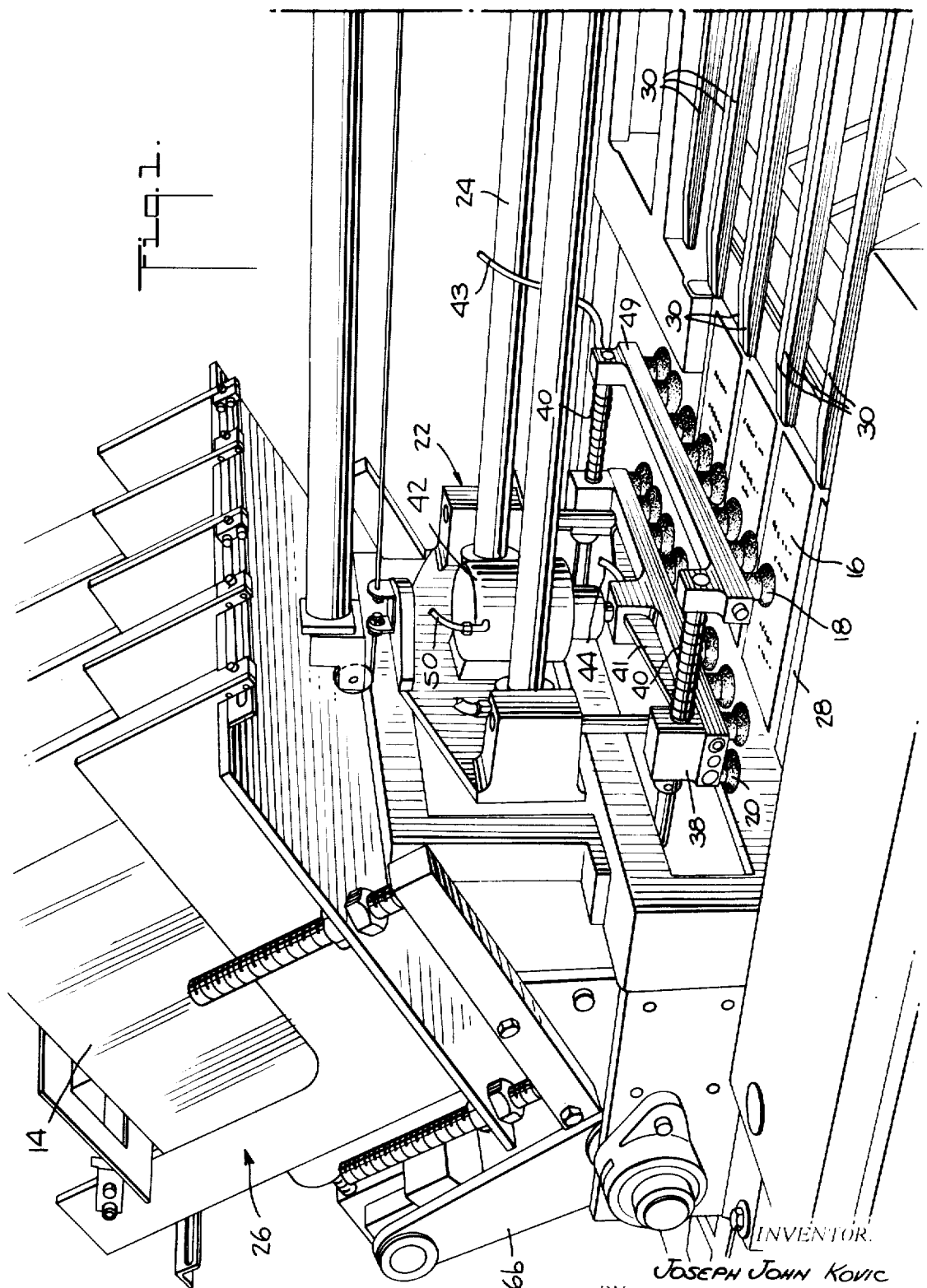
FIG. 1 is a perspective view of the side of the entrance portion of the apparatus of the invention.

The 24 suction cups are supported by a carriage mechanism, designated generally as 22 in FIGS. 1–4 which moves horizontally along two cylindrical slideways 24. The card feeding mechanism, designated generally as 26 in FIG. 1, is not part of the invention; however it is shown in order to point out the previous stage of the production line during which cards are positioned on top of the plastic blisters containing the goods and during which the blisters are heat sealed to the cards. The direction of movement in FIG. 1 is from left to right as viewed in the drawing. The function of the invention is to convey or transport packages 11 from a conveyor belt as the point where the packages emerge from under the card feeding and heat-sealing mechanism which is designated generally as 26, to a position on the upper surface of a plurality of guide rails 30. Two guide rails 30 support each of the four packages in an array or line extending across the machine. Consequently there are a total of eight guide rails. Other embodiments can be provided with a greater or lesser number of guide rails, depending upon the number of packages to be handled at a time. The function of transporting an array of packages comprises engaging the packages, lifting the packages upwardly, advancing the packages forwardly, placing the packages on the guide rails, and supporting the packages until they are pushed along the guide rails by the next successive array of packages toward the next station along the production line.

Figure 3:
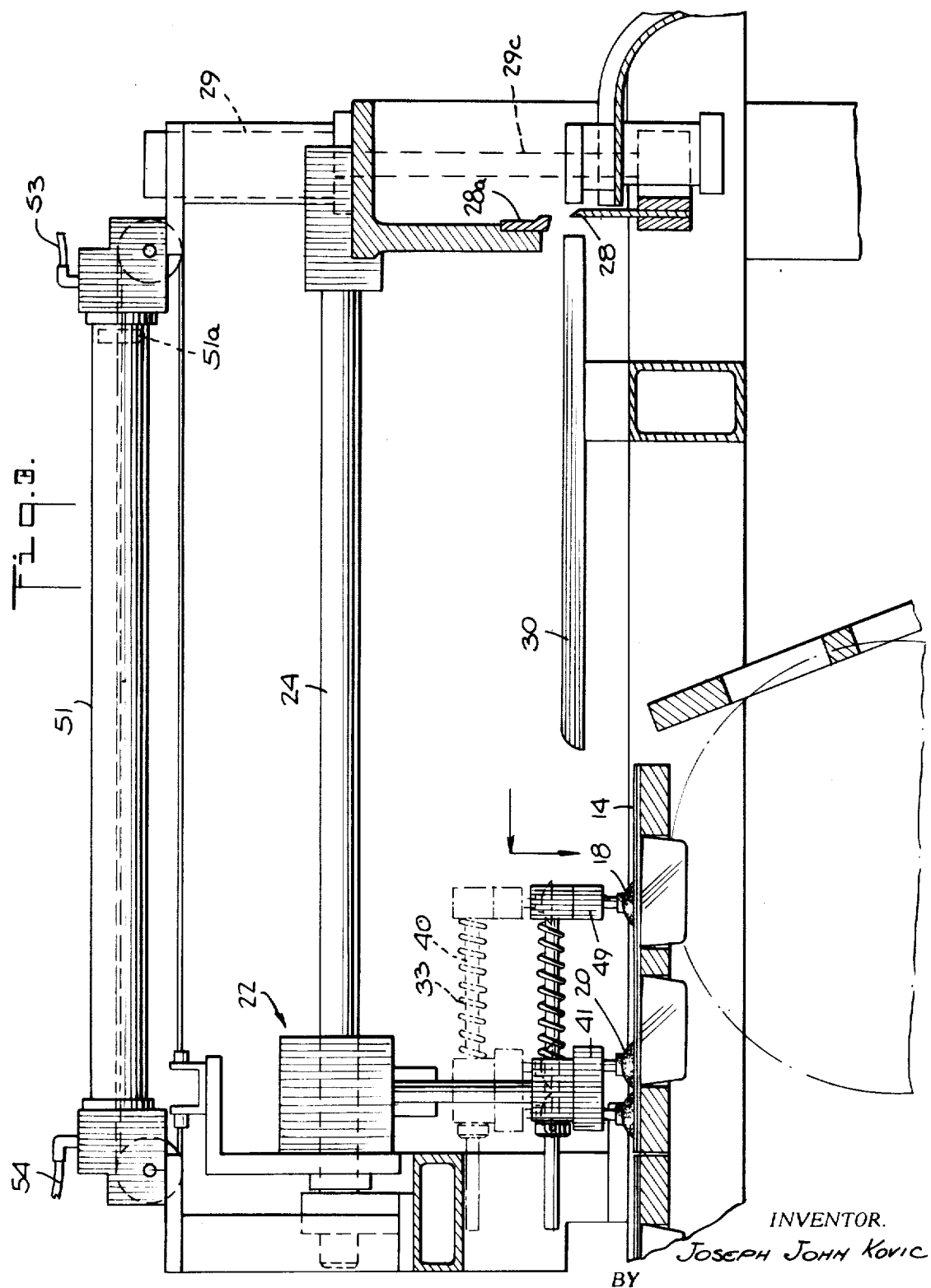
FIG. 3 is an enlarged fragmentary side elevational view of FIG. 2 showing the apparatus of the invention with the suction cups lowered into engagement with the articles which are to be transported.
Figure 4:
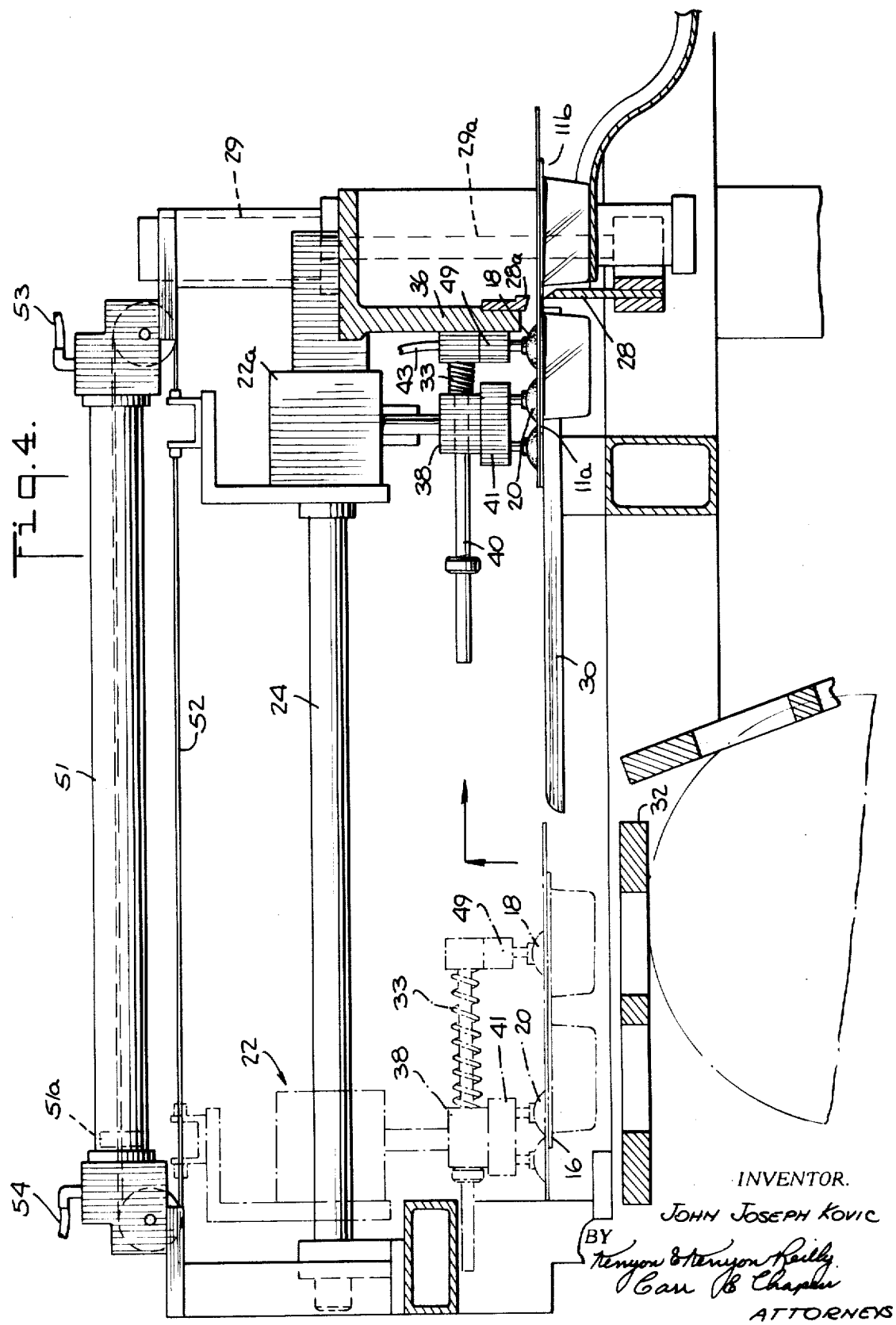
FIG. 4 is an enlarged fragmentary side elevational view of FIG. 2 showing the apparatus of the invention with the suction cups after having grasped and elevated the articles to be transported and subsequently after the cups have advanced the articles and lowered them for removal.

The apparatus of the invention is designed to be used in conjunction with a cutting apparatus shown in FIGS. 3–5. The blade 28 of the cutting apparatus is a guillotine blade which is raised to adjacent fixed blade 28a by actuators 29 having operating rods 29a connected to knife 28. The timing of the actuation of blade 28 is set to move the blade upwardly when a package is positioned under the blade 28a so that blade 28 cuts each of the four packages in half simultaneously.

FIG. 7 shows the package 11 before the package is cut in half by the blade 28 while FIG. 8 shows the package after the package has been cut in half. The blisters 12 are positioned on the card 14, as shown in FIG. 7, in a manner which ensures that there is an interval between the two blisters. The interval enables the cut to be made without interference with either blister.

Figure 2:
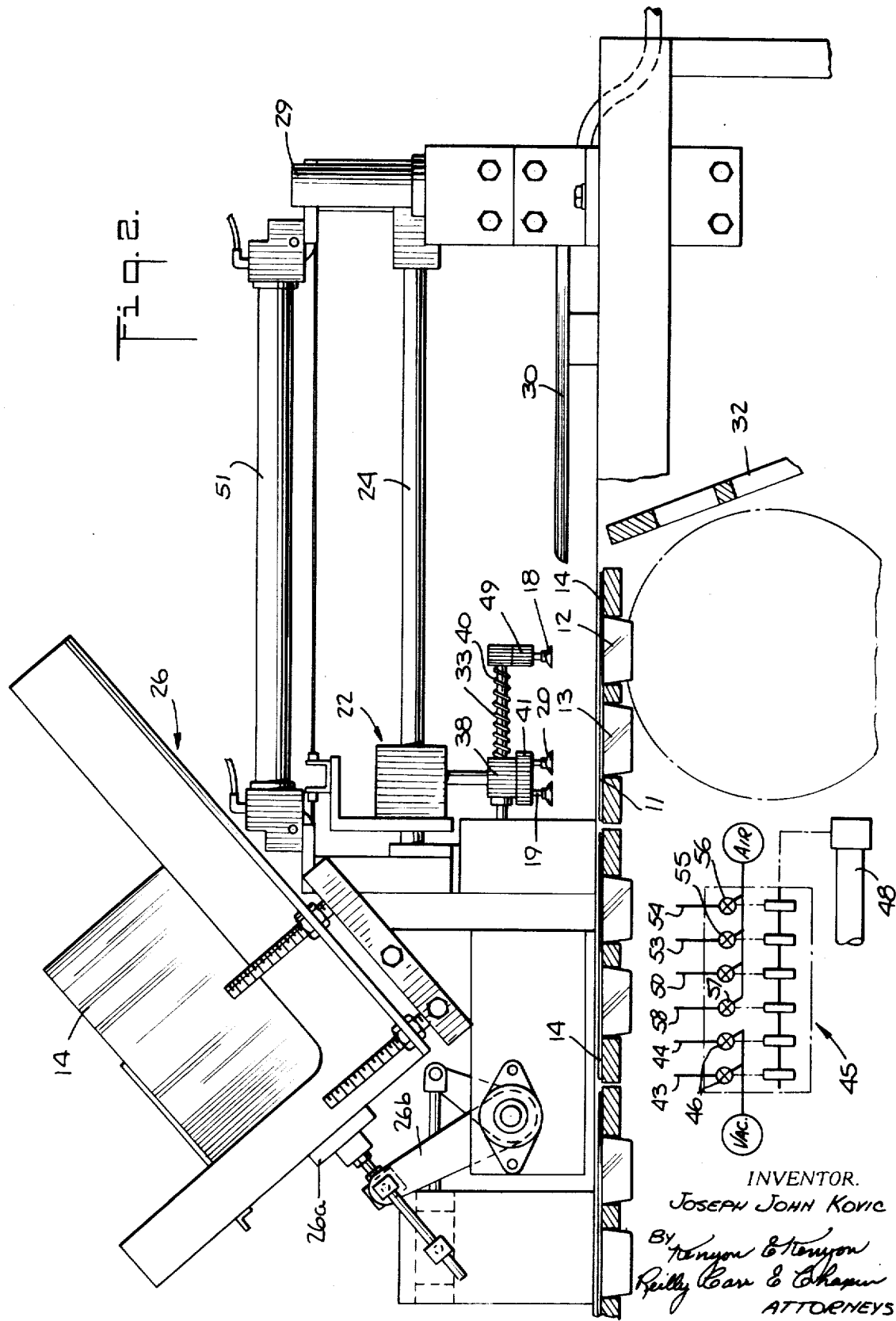
FIG. 2 is a side elevational view of the apparatus of the invention showing the suction cups and carriage in an elevated position before they have been engaged to the article.

As shown in FIG. 2 the upper reach of conveyor belt 32 ends beneath the entrance portion of guide rails 30. When the cycle of transporting an array of packages 11 from the conveyor belt 32 to the guide rails 30 begins, the blisters are in their elevated position. The forward suction cups 18 are positioned over the portion of card 14 overlying the blisters 12 which is at the forward end of the card 14. Each group of four rear suction cups 20 is positioned approximately over the portion of card 14 overlying rear blister 13 of the same card 14. Each suction cup is supported by the carriage mechanism 22 and is connected thereto by carrier 41 and vertical actuator 42.

As shown in FIG. 1, the suction cups 18 and 20 are then lowered down upon the packages in order to engage them to the top surface of the cards 14. Vacuum pressure is cyclically applied to suction cups 18 and 20 by vacuum lines 43 and 44, respectively. The application of vacuum to lines 43 and 44 is controlled by a master programmer 45 which contains a plurality of control valves 46 which are programmed by cams 47 driven by mainshaft 48 which drives the machine of the invention (FIG. 2). The vacuum pressure which is applied through internal passages in carriers 49 and 41 to suction cups 18 and 20 clamps the packages to the cups. Upon applying compressed air to actuator 42 through line 50 leading to one of the control valves of programmer 45, carrier 41 and carrier 49 coupled thereto are raised up from adjacent the conveyor belt 32.

After the packages 11 have been lifted off the conveyor belt 32, as shown in FIG. 4, the carriage mechanism 22 is driven forward by actuator 51 which is connected to the carriage mechanism by cable 52. The forward movement along slideways 24 causes the packages to be advanced onto the guide rails 30.

Actuator 51 contains piston 51a which can be reciprocated within the cylinder of the actuator upon the application of compressed air by means of either one of lines 53 and 54. In turn the flow of compressed air to lines 53 and 54 is controlled by valves 55 and 56 within programmer 45. By way of example actuator 51 can be of the type manufactured by TOL-O-MATIC, Inc. of Minneapolis, Minnesota.

As the carriage mechanism 22, shown in FIG. 4, reaches its forwardmost position 22a the housing 34 for the forward pairs of suction cups 18 make contact with the frame member 36 of the housing for the guillotine blade which is part of the next stage in the production line. The vacuum pressure being supplied to the forward pairs of suction cups 18 is timed so that it is turned off at this point, but vacuum pressure continues to be supplied to the groups of four rear suction cups 20. The removal of vacuum pressure from the forward pairs of suction cups 18 results in these suction cups being disengaged from the packages; however due to the engagement of cups 20 with the packages, the packages continue to be advanced. The carrier 49 for the forward pairs of suction cups 18 remains stationary at this time while carrier 41 for the groups of four rear suction cups 20 continues to move forward along the slideways 40.

When the packages 11 have been positioned adjacent the cutting mechanism, the blade splits the packages at their midpoint. The advance of the next successive row of packages pushes the preceding row of packages out of the other side of the cutting mechanism.

FIG. 5 illustrates the various packing stages in the production line. At the first station, the goods 10 are placed into plastic blisters 13. At the next station, a card of paperboard 14 is positioned over two blisters and the blisters are heat-sealed to the card. Then the card with the two blisters containing four items or pieces of goods is grasped by six suction cups 18 and 20, lifted from the conveyor belt 32 and placed on guide rails 30. The packages 11 are then advanced along the guide rails until they are positioned under a guillotine blade 28, whereupon they are split into two separate packages 11a and 11b, which packages then are pushed out the other side of the cutting mechanism to be packed in cartons.

FIG. 6 shows a row of packages 11 in position to be cut by the guillotine blade. The cut is made along the dashed lines 28. The forward pairs of suction cups 18 are no longer grasping the surface of the packages at this point in time because vacuum pressure has already been removed from these forward pairs suction cups 18. Vacuum pressure is in the process of being removed from the groups of four rear suction cups 20 at this time.

OPERATION

As shown in FIGS. 1 and 2 cards 14 are stored in card feeding mechanism 26. Suction cups 26a engage the lowermost card in each of the hoppers of mechanism 26 and in response to the arcuate motion of cranks 26b, cards 14 are placed upon blisters 12 carried by conveyor 32.

At a station in advance of card feeding mechanism 26, the goods 10 which are to be packaged are placed in the blisters by a mechanism not shown. As shown in FIGS. 2 and 7 a pair of blisters formed from a single sheet or web of plastic material are attached to one another. The blisters are formed by conventional thermoforming procedures. Cards 14 correspond in length to the length of the two blisters attached to one another.

In the location disposed below the hoppers of card feeding mechanism 26, the cards are heat-sealed (by a mechanism not shown) to the blisters. By way of example the cards can be formed from paperboard having a resin coating on the face thereof which is to be placed against flanges 12a of the blisters. Thus upon the application of heat and pressure to the card and the flanges, the resin coating on the card enables it to be bonded or tacked to the flanges of the blisters.

As shown in FIGS. 5 and 6 conveyor 32 comprises a web 32a of heat resistant material containing a plurality of openings 32b in which the blisters are inserted. Where the blisters are to be handled in pairs attached to one another as shown in FIG. 7, openings 32b are positioned in a corresponding fashion to receive and support the paired blisters. WHen conveyor 32 advances packages 11 to the position shown in FIGS. 1 and 2 underlying suction cups 18 and 20, actuator 42 attached to carrier 41 and thereby carrier 49 is caused to lower the carrier in order to engage the suction cups with the cards of the packages disposed beneath. When the cups have engaged the cards, programmer 45 operates valves 46 which apply vacuum by means of lines 43 and 44 to passages within carriers 49 and 41, respectively which communicate with the cups. In this way carriage 22 is coupled to each of the cards being advanced by conveyor 32.

The programmer then causes actuator 42 to elevate carrier 41 and 49, thereby lifting the packages 11 from engagement with conveyor 32. In response to the control of programmer 45 by means of valve 56 connected to line 53, piston 51a of actuator 51 is caused to move toward the left as viewed in FIG. 4 thereby advancing carriage 22 to the right as viewed in FIG. 4. As the carriage moves along slideways 24, packages 11 are advanced parallel to and above rails 30 extending away from the entrance portion of the machine. As the carriage approaches the right-end portion of slideways 24, as shown in FIG. 4, carrier 49 which supports suction cups 18 comes into contact with frame member 36 which is adapted to act as a stop for carrier 49. At this point programmer 45 by means of valve 46 terminates the application of vacuum through line 43 to the passages within carrier 49. As a result the engagement of suction cups 18 with respect to the cards is terminated.

When carrier 49 comes to rest against frame member 36, the continued movement of the carriage to the right, as viewed in FIG. 4, causes support rods 40 to be displaced within guides 38 and to compress springs 33. Since carrier 41 is independent of carrier 49 by virtue of the support rods 40, carriage 22 can continue to move toward the right as viewed in FIG. 4 and thereby continue to advance the packages to the right.

As shown in FIG. 4 packages 11 have been advanced by the suction cups along rails 30 to a position in which the leading blister of each of the packages is disposed beyond guillotine knife 28 and fixed knife 28a. At this point the packages still remain under the control of suction cups 20 and thus are held with respect to the path of travel of the guillotine knife. By means of valve 57 in programmer 45, compressed air is delivered to line 48 which is coupled to an actuator for vertically reciprocating guillotine knife 28 with respect to stationary knife 28a. Guides 29 and rods 29a maintain the vertical alignment of the guillotine blade. Operation of the guillotine knife serves to split or sever the packages in half so that each of the final packages contains only a single blister.

At the conclusion of the cycle of operation, programmer 45 terminates the application of pressure to suction cups 20. In this way the split packages are now resting freely on guide rails 30. Upon the advancement of the next array of packages, the previously split packages are pushed by the advancing packages on to discharge chute 59 (FIG. 5).

With the termination of vacuum to suction cups 20 programmer 45 controls actuator 42 to elevate carriers 41 and 49 in operation for their return to the starting position as shown in FIGS. 2 and 3. Once the suction cups are elevated programmer 45 applies pressure to line 54 in order to actuate piston 51a to move to the right as viewed in FIG. 4 and thereby return carriage 22 to the left as viewed FIG. 4. At this point the machine has been returned to its starting position and is thereby ready for the commencement of another cycle of operation.

What is claimed is:

1. In a machine which transports an article from a first location to a second location by engaging means, which include suction cups, to which reduced pressure is selectively applied and which selectively engage the upper surface of the article and support the article without undue distortion, sequentially between a lower position at which the article is engaged and an upper position in which the engaging means, with the article engaged, is transported by conveying means between the first location and the second location where the article is disengaged from said engaging means by releasing it free from said suction cups, the improvement comprising:

a leading array of at least one of said cups and a trailing array of at least one of said cups taken with respect to the direction of travel of said conveying means from the first location to the second location;

means for slidingly mounting said leading array, with respect to said means for sequentially moving said engaging means between a lower position and an upper position, for movement in a direction substantially parallel to the path of travel between the first and second locations;

means for biasing said mounting means in the direction of the second location and toward a position displaced from said sequential moving means; and means for abutting said mounting means to terminate the forward movement thereof adjacent the second location prior to the termination of the forward movement of said trailing array in response to said conveying means, whereby the portion of the article engaged by said leading array can be advanced beyond the second location when the forward movement of said mounting means is terminated by said abutting means.

2. A machine in accordance with claim 1 in which said leading array of at least one of said cups comprises a pair of said cups adapted to engage the leading portion of the article to be transported, said pair of cups being disposed along a line extending at substantially a right angle to the path of travel between the first and second locations; and in which said trailing array of at least one of said cups comprises at least one additional pair of said cups adapted to engage the trailing portion of the article to be transported, said additional pair of cups being disposed along an additional line extending at substantially a right angle to the path of travel between the first and second locations.

3. A machine in accordance with claim 1 in which said means for abutting said mounting means to terminate the forward movement thereof adjacent the second location prior to termination of the forward movement of said trailing array in response to said conveying means is positioned with respect to the second location to enable approximately one-half of the length of the article taken in the direction of the conveying by said conveying means to be advanced beyond the second location when the forward movement of said mounting means is terminated by said abutting means.

4. A machine in accordance with claim 1 in which said means for slidingly mounting said leading array of cups for movement in a direction substantially parallel to the path of travel between the first and second location comprises:

at least one shaft connected at one end portion thereof to said leading array of cups and extending substantially parallel to the path of travel between the first and second locations and in sliding engagement with said sequentially moving means, said shaft enabling the forward movement of said leading array adjacent the second location to be terminated prior to the termination of the forward movement of said trailing array of cups.

5. A machine in accordance with claim 4 in which said means for biasing said mounting means in the direction of the second station and toward a position displaced from said sequential moving means comprises a resilient member connected between said shaft and said sequentially moving means for urging said shaft and said leading array in a forward direction away from said sequentially moving means.

6. A machine in accordance with claim 1 in which said means coupled to said engaging means and said conveying means for sequentially moving said engaging means between a lower position in which the article can be engaged and an upper position in which the article can be transported comprises:

means for vertically reciprocating said engaging means between a lower position in which the article can be engaged and an upper position in which the article can be transported.

7. A machine in accordance with claim 1 and further comprising means disposed adjacent the second location and extending substantially parallel to the path of travel between the first and second locations for receiving the article being transported.

8. A machine in accordance with claim 7 in which said means disposed adjacent the second location and extending parallel to the path of travel between the first and second locations for receiving the article being transported comprises a pair of rails extending substantially parallel to one another toward the second station and spaced apart from one another at an interval enabling each of said pair of rails to engage the article being transported.

9. A machine in accordance with claim 7 in which said means disposed adjacent the second location and extending substantially parallel to the path of travel between the first and second locations for receiving the article being transported is positioned at a level substantially corresponding to the upper position in which the article is transported, whereby the article can be received directly from the upper position of the engaging means.

10. A machine in accordance with claim 1 and further comprising means adjacent the second location for severing the article intermediate the length thereof in a direction extending across the path of travel between the first location and the second location.

11. A machine in accordance with claim 1 in which means for selectively connecting the openings of said suction cups of said leading array and said trailing array to a source of reduced pressure further comprises means for terminating the application of said reduced pressure to said leading array when conveyed to adjacent the second location, whereby said cups of said leading array are released free of the article.

12. A machine in accordance with claim 1 and further comprising means adjacent the second location for severing the article intermediate the length thereof and adjacent the portion advanced beyond the second location in a direction extending across the path of travel between the first and second locations.

13. A method for transporting an article from a first location to a second location spaced apart from the first location comprising the steps of:

selectively engaging, by suction at the first location, the surface of the article in a leading array of positions and a trailing array of positions along the surface of the article taken with respect to the direction of transporting of the article from the first location to the second location;

sequentially moving the engaged article between a lower position, in which the article can be engaged, and an upper position for movement in a direction substantially parallel to the path of transporting between the first and second locations, in which the article can be transported;

transporting the engaged article from the first to the second location; and terminating, adjacent the second location, the engaging of the leading array of positions on the article prior to the termination of the forward movement of the article while still engaged in the trailing array of positions on the article, whereby the portion of the article formerly engaged at said leading array of positions thereon can be advanced beyond the second location.

14. A method in accordance with claim 13 and further comprising the step of receiving the article being transported at a level substantially corresponding to the upper position in which the article is transported.

15. A method in accordance with claim 13 and further comprising the step of severing the article intermediate the length thereof adjacent the second location and in a direction extending across the path of travel between the first location and the second location.

16. A machine in accordance with claim 1 in which the article transported is directed into and positioned for a cutting operation adjacent the second location further comprising:

guiding means adjacent the second location which receive the article and direct the segment of the article transported by the leading array of cups to enter into a cutting mechanism;

means for releasing said leading set of cups when the segment of the article transported by said leading array is under the control of said guiding means;

means consisting of positive stops which prevent said leading array from entering said cutting mechanism;

means to enable said trailing array to position said article under the cutting mechanism;

means to stop the forward travel of said trailing array when the article transferred reaches a predetermined position under said cutting mechanism;

means to operate said cutting mechanism;

means to release the trailing array of cups after the operation of the cutting mechanism.

17. A method for transporting an article from a first location to a second location spaced apart from the first location comprising the steps of:

selectively engaging, at the first location, the surface of the article in a leading array of positions and a trailing array of positions along the surface of the article taken with respect to the direction of transporting of the article from the first location to the second location;

sequentially moving the engaged article between a lower position, in which the article can be engaged, and an upper position for movement in a direction substantially parallel to the path of transporting between the first and second locations, in which the article can be transported;

transporting the engaged article from the first to the second locations; and terminating, adjacent the second location, the engaging of the leading array of positions on the article prior to the termination of the forward movement of the article while still engaged in the trailing array of positions on the article, whereby the portion of the article formerly engaged at said leading array of positions thereon can be advanced beyond the second location.

* * * * *

UNITED STATES PATENT OFFICE
CERTIFICATE OF CORRECTION

Patent No. 3,701,297       Dated  October 31, 1972

Inventor(s)   Joseph J. Kovic

It is certified that error appears in the above-identified patent and that said Letters Patent are hereby corrected as shown below:

Col. 1, line 11, "to" should be -- in --.

Col. 3, line 27, "as" should be -- at --.

Col. 5, line 17, after "pairs" insert -- of --.

Col. 6, line 57, after "viewed" insert -- in --.

Col. 5, line 54, "WHen" should be -- When --.

Col. 5, line 58, "carrier" should be -- carriers --.

Signed and sealed this 3rd day of July 1973.

(SEAL)
Attest:

EDWARD M. FLETCHER, JR.       Rene Tegtmeyer
Attesting Officer      Acting Commissioner of Patents